(12) United States Patent
Gutierrez (10) Patent No.: US 10,746,960 B2
(45) Date of Patent: Aug. 18, 2020

(54) MINIATURE LENS ASSEMBLY AND METHOD OF MAKING SAME

(71) Applicant: MEMS START, LLC, Arcadia, CA (US)

(72) Inventor: Roman Carlos Gutierrez, Arcadia, CA (US)

(73) Assignee: MEMS START, LLC, Arcadia, CA (US)

( * ) Notice: Subject to any disclaimer, the term of this patent is extended or adjusted under 35 U.S.C. 154(b) by 0 days.

(21) Appl. No.: 16/017,882

(22) Filed: Jun. 25, 2018

(65) Prior Publication Data

US 2018/0307008 A1   Oct. 25, 2018

Related U.S. Application Data

(62) Division of application No. 14/682,770, filed on Apr. 9, 2015, now Pat. No. 10,025,063.

(60) Provisional application No. 61/977,906, filed on Apr. 10, 2014.

(51) Int. Cl.
  *G02B 13/00* (2006.01)
  *G02B 7/02* (2006.01)
  *G03B 43/00* (2006.01)

(52) U.S. Cl.
  CPC ......... *G02B 13/0015* (2013.01); *G02B 7/021* (2013.01); *G02B 7/023* (2013.01); *G02B 7/025* (2013.01); *G03B 43/00* (2013.01); *G02B 13/001* (2013.01); *G02B 13/004* (2013.01); *G02B 13/0035* (2013.01); *G02B 13/0045* (2013.01)

(58) Field of Classification Search
  CPC .......... G02B 7/021; G02B 7/02; G02B 7/023; G11B 7/0932; G11B 7/0935; G03F 7/70825
  USPC ......................................... 359/813, 819, 822
  See application file for complete search history.

(56) References Cited

U.S. PATENT DOCUMENTS

| 2004/0145820 A1* | 7/2004 | Harwit | G02B 5/09 |
| | | | 359/811 |
| 2011/0069198 A1 | 3/2011 | Ezawa et al. | |
| 2012/0039594 A1* | 2/2012 | Lee | G02B 7/021 |
| | | | 396/348 |

(Continued)

FOREIGN PATENT DOCUMENTS

| CN | 102016678 A1 | 4/2011 |
| EP | 2148232 A1 | 1/2010 |

OTHER PUBLICATIONS

European Patent Office, Supplementary European Search Report for EP Patent Application No. 15 77 7080, dated Oct. 19, 2017, pp. 1-9.

(Continued)

*Primary Examiner* — James R Greece
(74) *Attorney, Agent, or Firm* — Sheppard, Mullin, Richter & Hampton LLP (57) ABSTRACT

A method of making a lens assembly is provided, including: providing a first plurality of lenses; providing a lens barrel; receiving the first plurality of lenses in the lens barrel; fixedly aligning the first plurality of lenses in the lens barrel; providing at least one additional lens having at least one degree of freedom of movement with respect to the first plurality of lenses; and fixing the at least one additional lens in a desired alignment position with respect to the first plurality of lenses.

15 Claims, 10 Drawing Sheets

(56) References Cited

U.S. PATENT DOCUMENTS

2012/0218649 A1   8/2012   Konishi et al.

OTHER PUBLICATIONS

Chinese Office Action corresponding to CN Application No. 2015800188899 dated May 21, 2018.

* cited by examiner

MINIATURE LENS ASSEMBLY AND METHOD OF MAKING SAME

CROSS-REFERENCE TO RELATED APPLICATIONS

This application is a divisional of U.S. patent application Ser. No. 14/682,770, filed Apr. 9, 2015, which claims priority to U.S. Provisional Patent Application Ser. No. 61/977,906, filed Apr. 10, 2014, the entireties of which are incorporated herein by reference.

TECHNICAL FIELD

This disclosure relates to lens assemblies in general, and in particular, to miniature lens assemblies for use in miniature cameras and projectors.

BACKGROUND

Various portable electronic devices such as cell phones and laptops use digital cameras to capture photographs and video and are expected to use digital projectors to display photographs or video on a screen or on an object. These are miniature digital cameras and include a miniature lens assembly, i.e., a lens assembly having a lens diameter of about 0.25 inches or less, which captures the light and focuses it onto a CMOS imager to capture an image. Inside a miniature projector, a lens assembly focuses the light from an LED array onto a screen or an object. The continuing demand for smaller and higher quality low cost imaging lens assemblies presents a considerable challenge to optical and mechanical design. The tiny lenses in the assembly should be aligned with respect to each other or a lens barrel within a few microns to ensure good image quality. Alignment errors between the lenses lead to a reduction in image quality. When the image quality of a lens assembly is not acceptable, the lens assembly is rejected. This leads to undesirable yield loss in the manufacturing of lens assemblies.

To reduce lens alignment errors and improve manufacturing yields of lens assemblies, a variety of passive alignment methods have been devised.

Figure 1A:
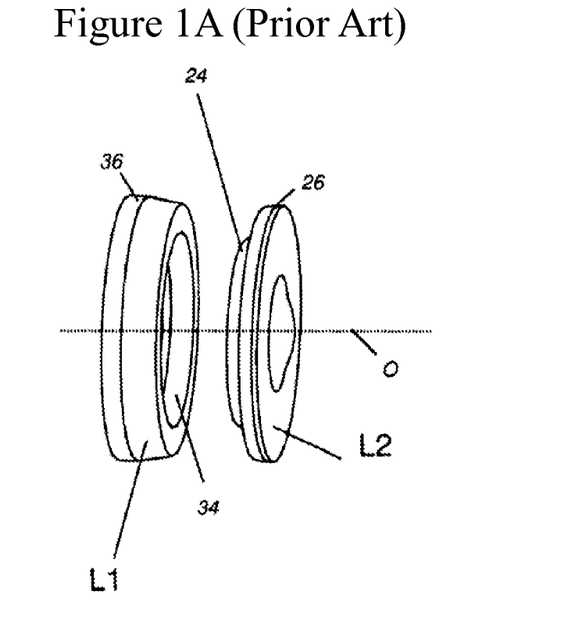
FIGS. 1A and 1B correspond to FIGS. 2 and 4 of prior art U.S. Pat. No. 7,088,530.
Figure 1B:
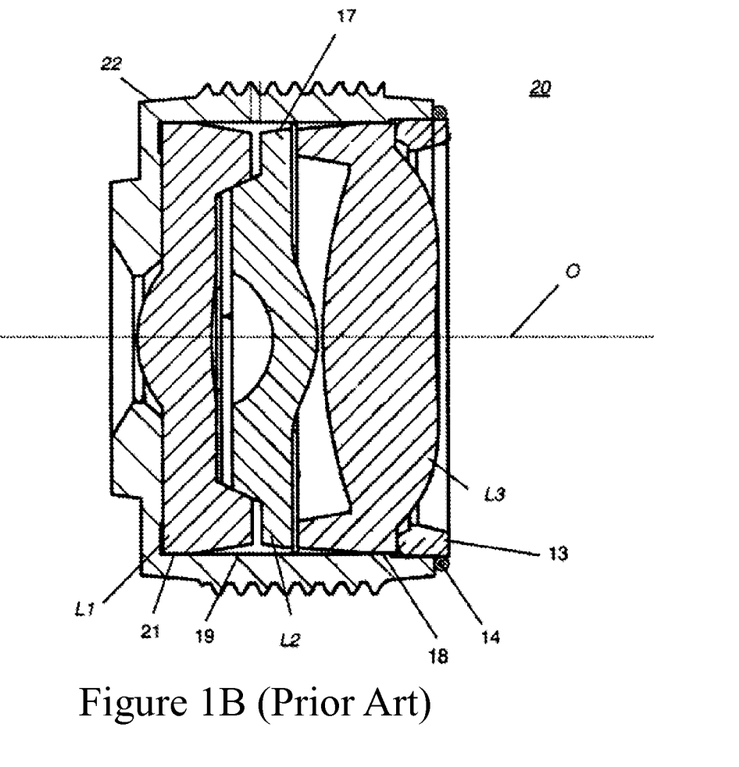

For example, referring to FIGS. 1A and 1B, reproduced from FIGS. 2 and 4, respectively, of U.S. Pat. No. 7,088,530 entitled "Passively Aligned Optical Elements" to Recco et al. In FIG. 1A, the alignment of two lenses L1 and L2 uses mating tapered surfaces 24 and 34. In FIG. 1B, lenses L1 and L3 are aligned to each other using the lens barrel 22. Lenses in this lens assembly are tightly stacked inside the lens barrel 22 into predefined positions and are not allowed to move.

As the resolution of a miniature camera increases, and the performance requirements for the lens assemblies become more stringent, the number of lenses in the lens assembly often increases. The increase in the number of optical elements that are stacked up tends to increase the impact of any alignment errors. As a result, the yield loss in the manufacture of lens assemblies using prior art passive alignment becomes worse when the number of lenses in the assembly increases.

As lens assemblies become smaller, the amount of light collected by the lens assembly is reduced and lower f-number designs are required. The larger aperture designs magnify the sensitivity to lens alignment errors and the yield loss in the manufacture of lens assemblies using prior art passive alignment becomes worse.

Active alignment of lenses is typically used for high performance optical systems where the cost of the active alignment is not an issue. However, known active alignment techniques, such as using an autocollimator and a rotational stage to individually align lenses can be too complex and costly for high-volume production of miniature lens assemblies.

There is a need in the art for a low cost method of manufacturing lens assemblies for use in miniature cameras and miniature projectors that combines the performance advantages of active alignment and the low cost advantages of passive alignment.

BRIEF SUMMARY OF THE DISCLOSURE

These and other objects and advantages are achieved in accordance with the present invention by the lens assembly and method of making same described herein.

According to an embodiment of the invention, a lens assembly includes multiple lenses; a lens barrel configured to receive and fixedly align the lenses; and at least one additional lens having at least one degree of freedom of movement with respect to the other lenses; wherein the additional lens(es) can be fixed in a desired alignment position with respect to the other lenses.

According to another embodiment of the invention, a lens assembly includes a first plurality of lenses and a lens barrel configured to receive and fixedly align the first plurality of lenses. At least one additional lens having at least one degree of freedom of movement with respect to the first plurality of lenses is provided wherein the at least one additional lens is fixable in a desired alignment position with respect to the first plurality of lenses.

According to a further embodiment of the invention, a method of making a lens assembly includes the steps of providing a first plurality of lenses, providing a lens barrel, receiving the first plurality of lenses in the lens barrel, and fixedly aligning the first plurality of lenses in the lens barrel. The method also includes providing at least one additional lens having at least one degree of freedom of movement with respect to the first plurality of lenses and fixing the at least one additional lens in a desired alignment position with respect to the first plurality of lenses.

According to another embodiment of the invention, a lens assembly includes a plurality of lenses aligned inside of a lens barrel, wherein a movable lens is aligned to compensate for the errors in passive alignment of or inherent flaws in the other lenses in the lens assembly. In order to permit such active alignment, a "rattle" space is initially left around the movable lens so that it is not completely mechanically constrained and can be moved in at least one alignment degree of freedom. Other lenses in the lens assembly are mechanically constrained in all degrees of freedom using passive alignment such as, but not limited to, passive component alignment of lenses to each other or passive alignment of lenses to the lens barrel.

In one embodiment, the movable lens has two alignment degrees of freedom orthogonal to the optical axis.

In another embodiment, the movable lens has one alignment degree of freedom along the optical axis. In still another embodiment, the allowable movement of the movable lens is sufficiently small so that the optical performance of the lens assembly is good enough to ascertain lens quality before the movable lens is aligned.

In a further embodiment, epoxy or additional adhesive is used to secure the movable lens after the active alignment is completed. In a still further embodiment, an alignment mechanism is used to passively align the movable lens to the lens barrel or to the other lenses, and the alignment mechanism can be removed at least partially when doing active alignment of the movable lens.

In an alternative embodiment, the movable lens has a smooth interface with respect to the adjacent lens so that the movable lens can slide on the surface of the adjacent lens without a substantial change in tip, tilt or spacing between the lenses.

In another embodiment, the movable lens has a smooth surface on its outer diameter so that the movable lens can slide along the lens barrel optical axis without a substantial change in tip, tilt, or decenter. In yet another embodiment, the movable lens is inside of a first portion of the lens barrel and the remaining lenses are inside of a second portion of the lens barrel and the two portions of the lens barrel are aligned and then fixed to each other in the aligned position.

Another embodiment of the method for making a lens assembly comprises the steps of loading a plurality of lenses in a lens barrel, leaving some rattle space for a movable lens, adjusting the position of the movable lens to optimize the optical performance of the lens assembly, and securing the position of the movable lens. In a further embodiment, the method includes passively aligning the movable lens in order to measure the quality of the lenses prior to active alignment.

The invention will be better understood with reference to the illustrative drawings and the detailed description of exemplary embodiments set forth as follows.

DETAILED DESCRIPTION

In accordance with embodiments further described herein, various lens assemblies are provided which may be used in miniature cameras or miniature projectors included in, for example, portable electronic devices such as cellphones.

Figure 2:
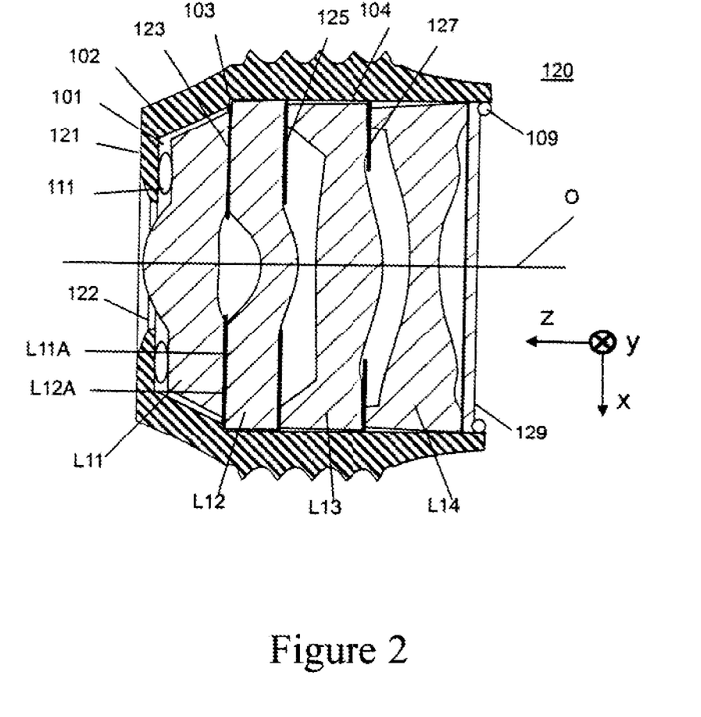
FIG. 2 is a cross-sectional view of a lens assembly in accordance with one embodiment of the present invention.

Referring now to the drawings, which are included for the purposes of illustrating embodiments of the invention, and not for limiting the same, FIG. 2 shows a crosssectional view of a lens assembly in accordance with one embodiment of the present invention. The lens assembly 120 is comprised of four lenses L11, L12, L13 and L14, three baffles 123, 125, and 127 and an IRCF (infra-red cut filter) 129 inserted in a lens barrel 121. The baffles are interspersed between the lenses as shown. Lenses L11, L12, L13 and L14 are made of conventional lens material such as glass, plastic, optical crystal or the like. Baffles 123, 125, and 127 are made of conventional baffle material such as plastic, cloth, paper, or the like. Lens barrel 121 is made of conventional lens barrel material such as plastic, metal, or the like. IRCF 129 is made of glass with an IR coating, plastic, or other conventional material.

IRCF 129 filters out infra-red light while passing visible light in order to improve the color of the image captured by a CMOS image sensor (not shown). IRCF 129 is an optional part of the lens barrel assembly and both its presence and location depend on the camera design. Alternatively, IRCF 129 may be replaced with another conventional filter.

The front of the lens barrel contains an aperture 122 on the front side, which serves as the entrance pupil for the imaging system.

Lens L12 is positioned inside lens barrel 121 in contact with an inner edge 103 and inside surface 104 of lens barrel 121. Lens L13 is adjacent to, and separated by baffle 125 from, lens L12 and is also in contact with inside surface 104. Lens L14 is adjacent to, and separated by baffle 127 from, lens L13 and is also in contact with inside surface 104. IRCF 129 is positioned in contact with lens L14 and inside surface 104. The stack of optical elements is fixed inside the lens barrel by epoxy 109 that connects IRCF 129 with lens barrel 121.

As a result, lenses L12, L13, and L14 are passively aligned in the lens assembly through physical contact among the lenses L12, L13, and L14, the baffles, and lens barrel 121. Alternatively, lenses L12, L13, and L14 could be aligned merely by connections between them. Depending on the method used and the dimensional tolerance of the lenses and lens barrel, the resulting optical alignment precision between lenses may be between less than 1 micron to over 15 microns in the x, y and z directions.

Movable lens L11 is positioned generally between aperture 122 and lens L12. Baffle 123 separates lenses L11 and L12. Movable lens L11 is not precisely positioned by the lens barrel 121 and there is a gap 101 that allows lens L11 to be moved in the z direction and a radial gap 102 that allows it to be moved in the x and y directions. The gap 102 allows between 5 microns and 50 microns of movement by lens L11 in the x and y directions, and preferably between 5 and 25 microns. Gap 101 may optionally be omitted.

To reduce certain optical aberrations such as astigmatism, the movable lens L11 may be aligned in the x and y directions so that its optical axis substantially coincides with the optical axis O of the lens assembly 120. This may be done by monitoring the through focus MTF (modulation transfer function) of the lens assembly while the position of the movable lens L11 is adjusted. The MTF measurement is known in the art and is typically performed by shining light through a mask that is placed at the image plane of the lens and monitoring the sharpness of the projected image with cameras. Through focus MTF measurement is also known in the art and consists of making multiple MTF measurements while changing the spacing between the lens assembly and the mask. Other conventional optical measurements of the lens assembly may be used for guiding the adjustment of the position of movable lens L11, including but not limited to, point spread function, line spread function, sharpness, contrast, brightness, spatial frequency response (SFR), subjective quality factor (SQF), and wave front measurements.

Misalignment of lenses L12, L13 and L14 and imperfections in the lenses themselves will typically cause the optical axis 0 of the lens assembly to not coincide exactly with the optical axis of lens L12. An idealized optical axis 0 of the lens assembly is shown in FIG. 2. Adjusting the alignment of lens L11 may be used to compensate, in whole or part, for such misalignment and imperfections or, alternatively, create desired optical effects.

Alternatively, since movement of lens L11 in the x and y directions also affects image plane tilt, the position of lens L11 may be adjusted so as to align the optical axis 0 with the perpendicular of the imager (not shown) so that the entire image is in better focus. This may be done during manufacturing of the lens assembly or after the lens assembly is mounted in the camera.

Once the movable lens L11 is aligned in the desired position, epoxy 111 is used to fix it in position. As shown in FIG. 2, in a preferred embodiment, lens L11 has a flat surface L11A and lens L12 has a flat surface L12A and both surfaces L11A and L12A are in contact with baffle 123. In an alternate embodiment, baffles 123, 125 and 127 are omitted allowing the lenses to contact each other directly at one or more interfaces. The baffles and interfaces between lenses are preferably designed to avoid allowing stray light to reach the imager (not shown).

Figure 3:
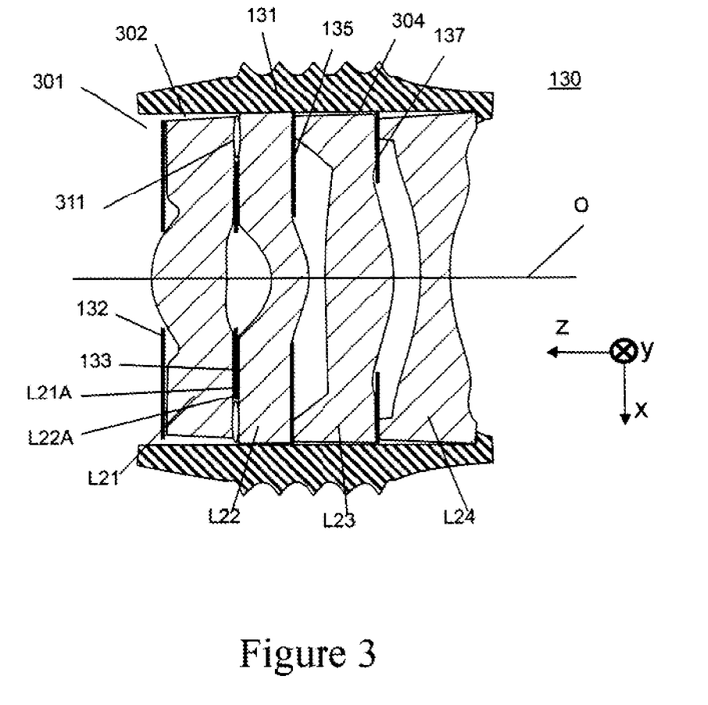
FIG. 3 is a cross-sectional view of a lens assembly in accordance with an additional embodiment of the present invention.

FIG. 3 shows a cross-sectional view of a lens assembly 130 in accordance with another embodiment of the present invention. The lens assembly 130 is comprised of four lenses L21, L22, L23 and L24, and four baffles 132, 133, 135, and 137 inserted in a lens barrel 131. The baffles are interspersed between the lenses as shown. Lenses L21, L22, L23 and L24 are made of conventional lens material such as glass, plastic, optical crystal or the like. Baffles 133, 135, and 137 are made of conventional baffle material such as plastic, cloth, paper, or the like. Lens barrel 131 is made of conventional lens barrel material such as plastic, metal, or the like.

Lens L24 is positioned inside lens barrel 131 in contact with a back edge and inside surface 304 of lens barrel 131. Lens L33 is adjacent to, and separated by baffle 137 from, lens L24 and is also in contact with inside surface 304. Lens L22 is adjacent to, and separated by baffle 135 from, lens L23 and is also in contact with inside surface 304.

As a result, lenses L22, L23, and L24 are passively aligned in the lens assembly through physical contact among the lenses L22, L23, and L24, the baffles, and lens barrel 131. Alternatively, lenses L22, L23, and L24 could be aligned merely by connections between them. Depending on the method used and the dimensional tolerance of the lenses and lens barrel, the resulting optical alignment precision between lenses may be between less than 1 micron to over 15 microns in the x, y and z directions.

Movable lens L21 is positioned in front of lens L22. Baffle 133 separates lenses L21 and L22. Movable lens L21 is not precisely positioned by lens barrel 131. Baffle 133 is positioned in contact with inside surface 304 of lens barrel 131 or by mating with a feature on the front surface of lens L22 or on the back surface of lens L21. Front baffle 132 on the front side of lens L21 serves as the entrance pupil for the imaging system and may be attached to lens L21 using, for example, adhesive. There is a space 301 that allows lens L21 to be moved in the z direction and a radial gap 302 that allows it to be moved in the x and y directions. Gap 302 allows movement of lens L21 in the x and y directions by between 5 microns and 50 microns, and preferably, between 5 and 25 microns.

To reduce certain optical aberrations such as astigmatism, the lens L21 may be aligned in the x and y directions so that its optical axis substantially coincides with the optical axis 0 of the lens assembly 130. This may be done by monitoring the through focus MTF (modulation transfer function) of the lens assembly while the position of lens L21 is adjusted. Misalignment of lenses L22, L23 and L24 and imperfections in the lenses themselves will typically cause the optical axis 0 of the lens assembly to not coincide exactly with the optical axis of lens L22. An idealized optical axis 0 of the lens assembly is shown in FIG. 3. Adjusting the alignment of lens L21 may be used to compensate, in whole or part, for such misalignment and imperfections or, alternatively, create desired optical effects.

Alternatively, since movement of lens L21 in the x and y directions also affects image plane tilt, the position of lens L21 may be adjusted so as to align the optical axis 0 with the perpendicular of the imager (not shown) so that the entire image is in better focus. This may be done during manufacturing of the lens assembly or after the lens assembly is mounted in the camera.

Once lens L21 is aligned to the desired position, epoxy 311 is used to fix it in position with respect to lens L22. In an alternate embodiment, epoxy 311 may come in contact with lens barrel 131 and fix all lenses inside the lens barrel. As shown in FIG. 3, in a preferred embodiment, lens L21 has a flat surface L21A and lens L22 has a flat surface L22A and both surfaces L21A and L22A are in contact with baffle 133. In an alternate embodiment, baffles 133, 135 and 137 are omitted allowing the lenses to contact each other directly at one or more interfaces. The baffles and interfaces between lenses are preferably designed to avoid allowing stray light to reach the imager (not shown).

Figure 4:
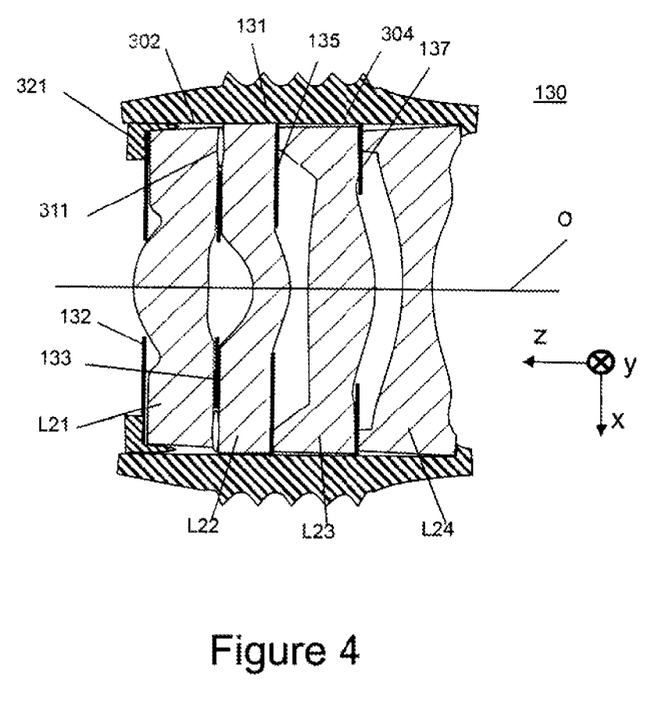
FIG. 4 is a cross-sectional view of a lens assembly in accordance with a further embodiment of the present invention.

FIG. 4 shows a cross-sectional view of the lens assembly 130 of FIG. 3 with a passive alignment ring 321 added to fill a portion of gap 302. Passive alignment ring is preferably made of rubber, plastic, epoxy, metal, or other conventional material. Passive alignment ring 321 can be used to passively align movable lens L21 into a position where the optical performance of the lens assembly is of sufficient quality to permit MTF measurements for determining whether more precise alignment of movable lens L21 is warranted. Passive alignment ring 321 is preferably removed after initial MTF measurements are made and before active alignment of movable lens L21. Ring 321 is preferably omitted from a final lens assembly, as shown in FIG. 3.

Alternatively, if the MTF measurements show that the lens assembly meets final requirements, passive alignment ring 321 may be left in place and remain present in the final lens assembly. As a result, some lens assemblies may have a passive alignment ring as illustrated in FIG. 4 and some may not as illustrated in FIG. 3. If the passive alignment ring 321 is left on the lens assembly 130, it may be preferably fixed to the lens barrel 131 using epoxy, welding, or another conventional method of attachment.

Figure 5:
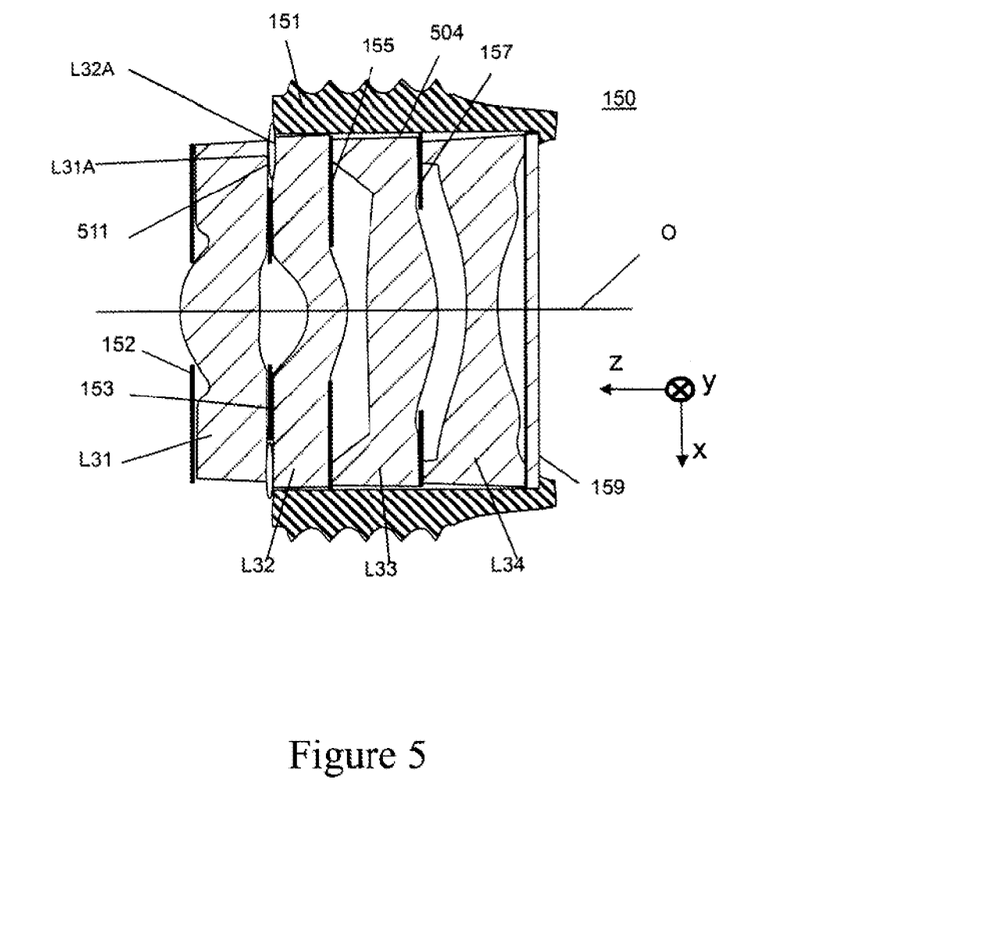
FIG. 5 is a cross-sectional view of a lens assembly in accordance with a still further embodiment of the present invention.

FIG. 5 shows a cross-sectional view of a lens assembly 150 in accordance with still another embodiment of the present invention. The lens assembly 150 is comprised of four lenses L31, L32, L33 and L34, an IRCF window 159, and four baffles 152, 153, 155, and 157 inserted in a lens barrel 151. The baffles are interspersed between the lenses as shown. Lenses L31, L32, L33 and L34 are made of conventional lens material such as glass, plastic, optical crystal or the like. Baffles 153, 155, and 157 are made of conventional baffle material such as plastic, cloth, paper, or the like. Lens barrel 151 is made of conventional lens barrel material such as plastic, metal, or the like. IRCF window 159 is made of glass with an IR coating, plastic, or other conventional material.

IRCF window 159 filters out infra-red light while passing visible light in order to improve the color of the image captured by a CMOS image sensor (not shown). IRCF window 159 is an optional part of the lens barrel assembly and both its presence and location depend on the camera design. Alternatively, IRCF window 159 may be replaced with another conventional filter.

IRCF window 159 is positioned inside lens barrel 131 in contact with a back edge and inside surface 504 of lens barrel 131. Lens L34 is in contact with IRCF window 159 and inside surface 504. Lens L33 is adjacent to, and separated by baffle 157 from, lens L34 and is also in contact with inside surface 504. Lens L32 is adjacent to, and separated by baffle 155 from, lens L33 and is also in contact with inside surface 504.

As a result, lenses L32, L33, and L34 are passively aligned in the lens assembly through physical contact among the lenses L32, L33, and L34, the baffles, and lens barrel 151. Alternatively, lenses L32, L33, and L34 could be aligned merely by connections between them. Depending on the method used and the dimensional tolerance of the lenses and lens barrel, the resulting optical alignment precision between lenses may be between less than 1 micron to over 15 microns in the x, y and z directions.

Movable lens L31 is positioned in front of lens L32. Baffle 153 separates lenses L31 and L32. Movable lens L31 is not positioned within lens barrel 151. Baffle 153 is adhered to, or mates with a feature on, the front surface of lens L32 or the back surface of lens L31. Front baffle 152 on the front side of lens L31 serves as the entrance pupil for the imaging system and may be attached to lens L31 using, for example, adhesive. The movable lens L31 lies substantially outside the lens barrel 151 and is free to move in the x, y and z directions.

To reduce certain optical aberrations such as astigmatism, lens L31 may be aligned in the x and y directions so that its optical axis substantially coincides with the optical axis 0 of the lens assembly 150. This may be done by monitoring the through focus MTF (modulation transfer function) of the lens assembly while the position of lens L31 is adjusted. Misalignment of lenses L32, L33 and L34 and imperfections in the lenses themselves will typically cause the optical axis 0 of the lens assembly to not coincide exactly with the optical axis of lens L32. An idealized optical axis 0 of the lens assembly is shown in FIG. 5. Adjusting the alignment of lens L21 may be used to compensate, in whole or part, for such misalignment and imperfections or, alternatively, create desired optical effects.

Alternatively, since movement of lens L31 in the x and y directions also affects image plane tilt, the position of lens L31 may be adjusted so as to align the optical axis 0 with the perpendicular of the imager (not shown) so that the entire image is in better focus. This may be done during manufacturing of the lens assembly or after the lens assembly is mounted in the camera.

Once lens L31 is aligned to the desired position, epoxy 511 is used to fix it in position with respect to lens L32 and lens barrel 151 and fix all lenses inside the lens barrel. As shown in FIG. 5, in a preferred embodiment, lens L31 has a flat surface L31A and lens L32 has a flat surface L32A and both surfaces L31A and L32A are in contact with baffle 153. In an alternate embodiment, baffles 153, 155 and 157 are omitted allowing the lenses to contact each other directly at one or more interfaces. The baffles and interfaces between lenses are preferably designed to avoid allowing stray light to reach the imager (not shown).

Figure 6:
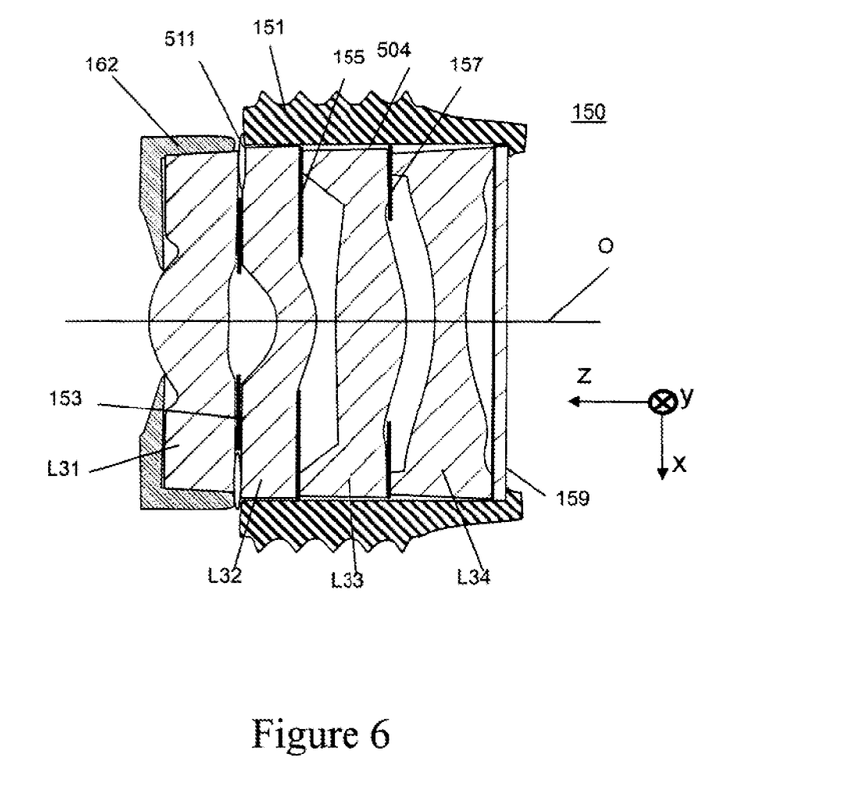
FIG. 6 is a cross-sectional view of a lens assembly in accordance with another embodiment of the present invention.

FIG. 6 shows a cross-sectional view of the lens assembly 150 in FIG. 5 with a lens cover 162 replacing the baffle 152. Cover 162 preferably prevents stray light from entering the optical system through the sides of lens L31. Like baffle 152, lens cover 162 may define an entrance pupil for the imaging system. Cover 162 is preferably made of injection molded plastic and attached to lens L31 by interference fit, with adhesive, or like attachment.

Figure 7:
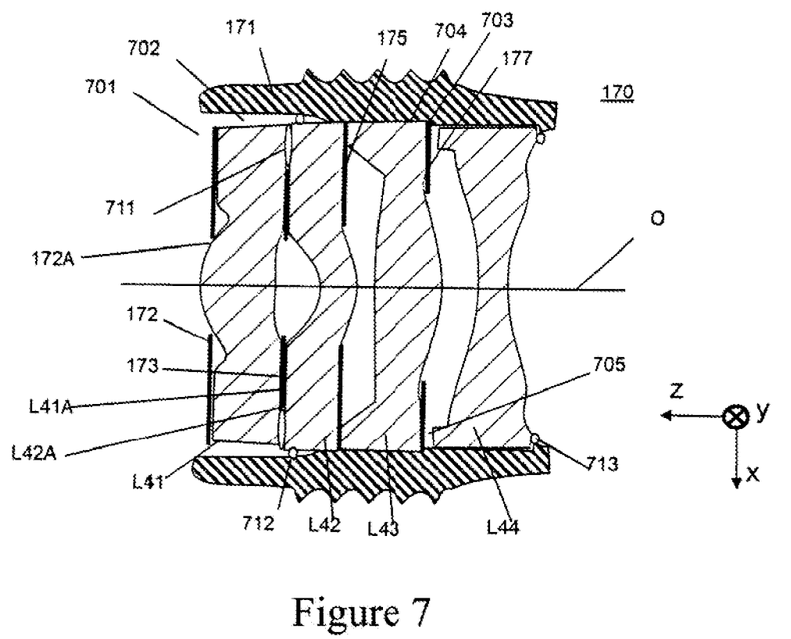
FIG. 7 is a cross-sectional view of a lens assembly in accordance with yet another embodiment of the present invention.

FIG. 7 shows a cross-sectional view of a lens assembly 170 in accordance with a further embodiment of the present invention. The lens assembly 170 is comprised of four lenses L41, L42, L43 and L44 and four baffles 172, 173, 175, and 177. The positions of the first movable lens L41 and the second movable lens L44 are adjustable in order to optimize the optical performance of the lens assembly 170. The second lens L42 and the third lens L43 are passively aligned. The baffles are interspersed between the lenses as shown. Lenses L41, L42, L43 and L44 are made of conventional lens material such as glass, plastic, optical crystal or the like. Baffles 173, 175, and 177 are made of conventional baffle material such as plastic, cloth, paper, or the like. Lens barrel 171 is made of conventional lens barrel material such as plastic, metal, or the like.

Baffle 177 is positioned inside lens barrel 171 in contact with edge 703 and inside surface 704 of lens barrel 171. Lens L43 is positioned inside lens barrel 171 in contact with baffle 177 and inside surface 704 of lens barrel 171. Lens L42 is adjacent to, and separated by baffle 175 from, lens L43 and is also in contact with inside surface 704. Optionally, epoxy 712 attaches lens L42 to inside surface 704 and fix the position of lenses L42 and L43.

As a result, lenses L42 and L43 are passively aligned in the lens assembly through physical contact among the lenses L42 and L43, the baffles, and lens barrel 171. Alternatively, lenses L42 and L43 could be aligned merely by connections between them. Depending on the method used and the dimensional tolerance of the lenses and lens barrel, the resulting optical alignment precision between lenses L42 and L43 may be between less than 1 micron to over 15 microns in the x, y and z directions.

Movable lens L41 is positioned in front of lens L42. Baffle 173 separates lenses L41 and L42. Movable lens L41 is positioned in lens barrel 171 but is not precisely positioned. Radial gap 702 allows movement of lens L41 in the x and y directions by between 5 microns and 50 microns, and preferably, between 5 and 25 microns. Baffle 173 is adhered to, mates with a feature on, or is aligned with a recessed feature on, the front surface of lens L42 or the back surface of lens L41.

The front baffle 172 is attached to the front surface of the movable lens L41 using, for example, adhesive. Baffle 172 has an aperture 172A that defines the entrance pupil for the imaging system. The entrance pupil may also be formed by baffle 173 or another aperture in the system. There is a space 701 that allows lens L41 to be moved in the z direction.

Movable lens L44 is positioned in lens barrel 171 behind lens L43 and baffle 177 but is not precisely positioned. Gap 705 separates baffle 177 and lens L44 and allows movable lenses L44 to be moved in the z direction adjusting its spacing with respect to fixed lens L43. The position of lens L44 in the x and y directions and its tilt about the x and y axes is passively set by contact with the inside surface 704 of lens barrel 171.

In an alternate embodiment, there is a radial gap between lens L44 and lens barrel 171 to allow the position and tilt of lens L44 to be adjusted in the x and y directions.

To reduce certain optical aberrations such as astigmatism, lens L41 may be aligned in the x and y directions so that its optical axis substantially coincides with the optical axis 0 of the lens assembly 170. This may be done by monitoring the through focus MTF (modulation transfer function) of the lens assembly while the position of lens L41 is adjusted. Misalignment of lenses L42, L43, and/or L44 and imperfections in the lenses themselves will typically cause the optical axis 0 of the lens assembly to not coincide exactly with the optical axis of lens L42. An idealized optical axis 0 of the lens assembly is shown in FIG. 7. Adjusting the alignment of lens L41 may be used to compensate, in whole or part, for such misalignment and imperfections or, alternatively, create desired optical effects.

Alternatively, since movement of lens L41 in the x and y directions also affects image plane tilt, the position of lens L41 may be adjusted so as to align the optical axis 0 with the perpendicular of the imager (not shown) so that the entire image is in better focus. This may be done during manufacturing of the lens assembly or after the lens assembly is mounted in the camera.

Once lens L41 is aligned to the desired position, epoxy 711 is used to fix it in position with respect to lens L22. In an alternate embodiment, epoxy 711 may come in contact with lens barrel 171 and fix lenses L41, L42, and L43 inside the lens barrel. As shown in FIG. 7, in a preferred embodiment, lens L41 has a flat surface L41A and lens L42 has a flat surface L42A and both surfaces L41A and L42A are in contact with baffle 173. In an alternate embodiment, baffles 173, 175 and 177 are omitted, allowing the lenses to contact each other directly at one or more interfaces. The baffles and interfaces between lenses are preferably designed to avoid allowing stray light to reach the imager (not shown).

To reduce certain optical aberrations such as field curvature, movable lens L44 is preferably aligned in the z direction so as to set optimum spacing between lenses L43 and L44. Once movable lens L44 is aligned in the desired position, epoxy 713 is used to fix it in position.

Alternatively, additional lenses and baffles may be included in the lens assembly to achieve the desired optical performance, and less than four lenses and four baffles may be used to reduce cost.

In this example, movement of lens L41 in the x and y directions strongly affects image plane tilt and astigmatism, while movement of lens L44 in the z direction strongly affects field curvature. To determine which lenses to actively align and in what direction, a sensitivity analysis can be done on the specific optical design to determine which lenses have large contribution on the aberration that needs to be corrected. More generally, specific optical aberrations can be induced or corrected by adjusting the positions of lenses L41 and L44 to obtain a desired optical performance of the lens assembly.

Figure 8:
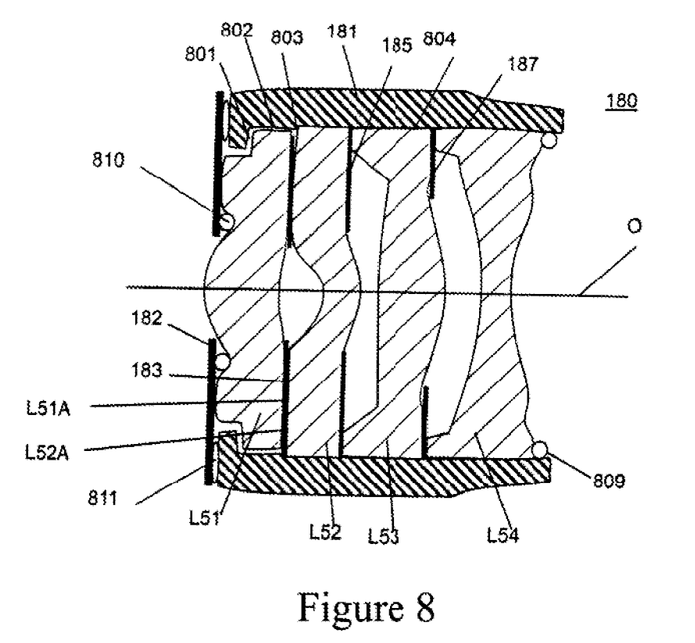
FIG. 8 is a cross-sectional view of a lens assembly in accordance with an additional embodiment of the present invention.

FIG. 8 shows a cross-sectional view of a lens assembly 180 in accordance with yet another embodiment of the present invention. The lens assembly 180 is comprised of four lenses L51, L52, L53 and L54 and three baffles 183, 185, and 187 inserted in a lens barrel 181. The baffles are interspersed between the lenses as shown. Lenses L51, L52, L53 and L54 are made of conventional lens material such as glass, plastic, optical crystal or the like. Baffles 183, 185, and 187 are made of conventional baffle material such as plastic, cloth, paper, or the like. Lens barrel 181 is made of conventional lens barrel material such as plastic, metal, or the like.

Lens L52 is positioned inside lens barrel 181 in contact with an inner edge 803 and inside surface 804 of lens barrel 121. Lens L53 is adjacent to, and separated by baffle 185 from, lens L52 and is also in contact with inside surface 804. Lens L54 is adjacent to, and separated by baffle 187 from, lens L53 and is also in contact with inside surface 804. The stack of optical elements is fixed inside the lens barrel by epoxy 809 that connects lens L54 with lens barrel 121. Baffle 182 defines an aperture which serves as the entrance pupil for the imaging system. Baffle 182 is optionally attached to the front of lens L51 using epoxy 810 and/or attached to lens barrel 181 using epoxy 811.

As a result, lenses L52, L53, and L54 are passively aligned in the lens assembly through physical contact among the lenses L52, L53, and L54, the baffles, and lens barrel 181. Alternatively, lenses L52, L53, and L54 could be aligned merely by connections between them. Depending on the method used and the dimensional tolerance of the lenses and lens barrel, the resulting optical alignment precision between lenses may be between less than 1 micron to over 15 microns in the x, y and z directions.

Movable lens L51 is positioned in front of lens L52. Baffle 183 separates lenses L51 and L52. Movable lens L51 is not precisely positioned by lens barrel 181 and there is a gap 801 that allows movable lens L51 to be moved in the z direction and a radial gap 802 that allows it to be moved in the x and y directions. The gap 802 allows between 5 microns and 50 microns of movement by lens L51 in the x and y directions, and preferably between 5 and 25 microns. The position of lens L51 is preferably fixed with respect to lens barrel 181 by the combination of baffle 182, epoxy 810, and epoxy 811. Gaps 801 or 802 may optionally be omitted.

To reduce certain optical aberrations such as astigmatism, the movable lens L51 may be aligned in the x and y directions so that its optical axis substantially coincides with the optical axis 0 of the lens assembly 180. This may be done by monitoring the through focus MTF (modulation transfer function) of the lens assembly while the position of the movable lens L51 is adjusted. Other conventional optical measurements of the lens assembly may be used for guiding the adjustment of the position of movable lens L51, including but not limited to, point spread function, line spread function, sharpness, contrast, brightness, spatial frequency response (SFR), subjective quality factor (SQF), and wave front measurements.

Misalignment of lenses L52, L53 and L54 and imperfections in the lenses themselves will typically cause the optical axis 0 of the lens assembly to not coincide exactly with the optical axis of lens L52. An idealized optical axis 0 of the lens assembly is shown in FIG. 8. Adjusting the alignment of lens L51 may be used to compensate, in whole or part, for such misalignment and imperfections, or, alternatively, create desired optical effects.

Alternatively, since movement of lens L51 in the x and y directions also affects image plane tilt, the position of lens L51 may be adjusted so as to align the optical axis 0 with the perpendicular of the imager (not shown) so that the entire image is in better focus. This may be done during manufacturing of the lens assembly or after the lens assembly is mounted in the camera.

In a further alternate embodiment, once the movable lens L51 is aligned in the desired position, epoxy (not shown) between lens L51 and inner surface 804 is used to fix it in position. As shown in FIG. 8, in a preferred embodiment, lens L51 has a flat surface L51A and lens L52 has a flat surface L52A and both surfaces L51A and L52A are in contact with baffle 183. In an alternate embodiment, baffles 183, 185 and 187 are omitted allowing the lenses to contact each other directly at one or more interfaces. The baffles and interfaces between lenses are preferably designed to avoid allowing stray light to reach the imager (not shown).

Figure 9:
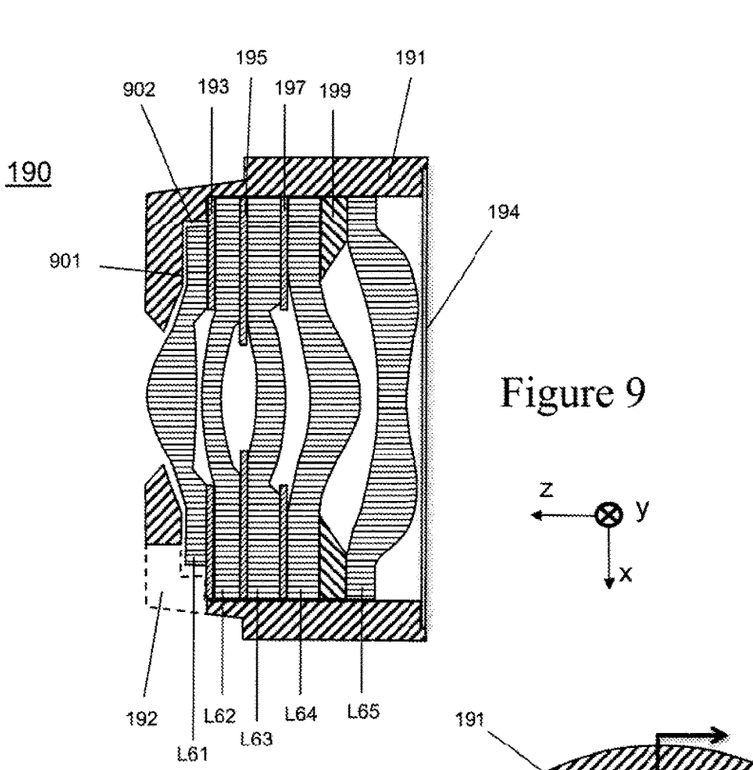
FIG. 9 is a cross-sectional view of a lens assembly in accordance with a further embodiment of the present invention.

FIG. 9 shows a cross-sectional view of a lens assembly in accordance with an embodiment of the present invention similar to that described in connection with FIG. 2. The lens assembly 190 is comprised of five lenses L61, L62, L63, L64, and L65; three baffles 193, 195, and 197; lens spacer 199; and IRCF 194 inserted in a lens barrel 191. The baffles and the lens spacer are interspersed between the lenses as shown. Lenses L61, L62, L63, L64 and L65 are made of conventional lens material such as glass, plastic, optical crystal or the like. Baffles 193, 195, and 197 are made of conventional baffle material such as plastic, cloth, paper, or the like. Lens barrel 191 is made of conventional lens barrel material such as plastic, metal, or the like. IRCF 194 is made of glass with an IR coating, plastic, or other conventional material. Lens spacer 199 is made of plastic, rubber, metal, or the like.

Movable lens L61 is not precisely positioned by lens barrel 191 and there is a gap 901 that allows lens L61 to be moved in the z direction and a radial gap 902 that allows it to be moved in the x and y directions. The gap 902 allows between 5 microns and 50 microns of movement by lens L61 in the x and y directions, and preferably between 5 and 25 microns. Gap 901 may optionally be omitted.

The front surface of lens barrel 191 includes preferably three openings 192 which permit access to movable lens L61 for performing active alignment of lens L61 with the stack of lens L62, L63, L64 and L65 or for fixing the position of lens L61 in a desired position. Lens L61 is moved via the holes 192 into the desired alignment position and epoxy is inserted through holes 192 to fix lens L61 in the desired position.

Figure 10:
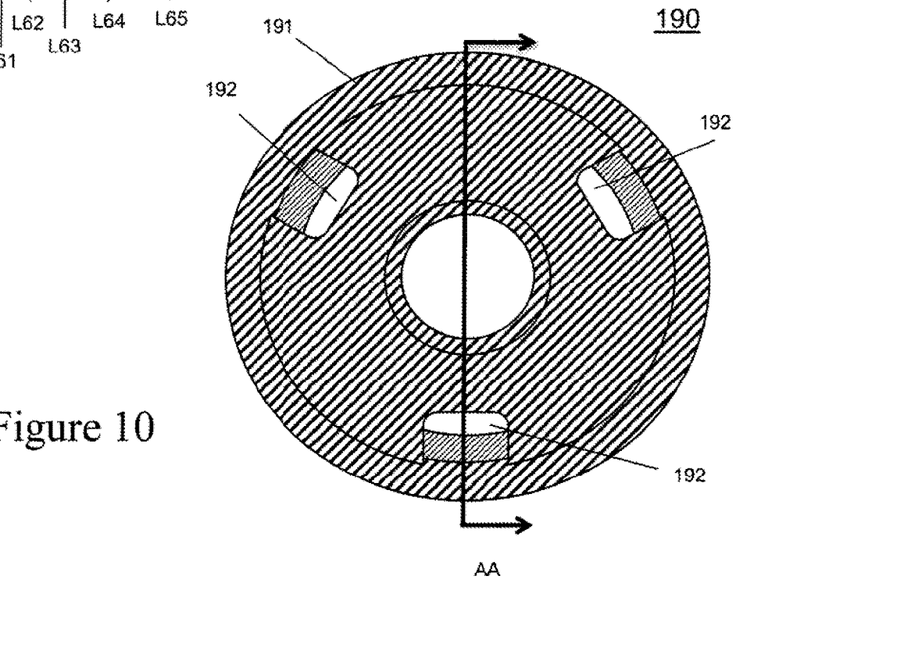
FIG. 10 is a front view of the lens assembly of FIG. 9.

FIG. 10 is a top view of lens assembly 190 of FIG. 9. For clarity, FIG. 9 is a cross-sectional view of lens assembly 190 taken across Line AA of FIG. 10.

Figure 11:
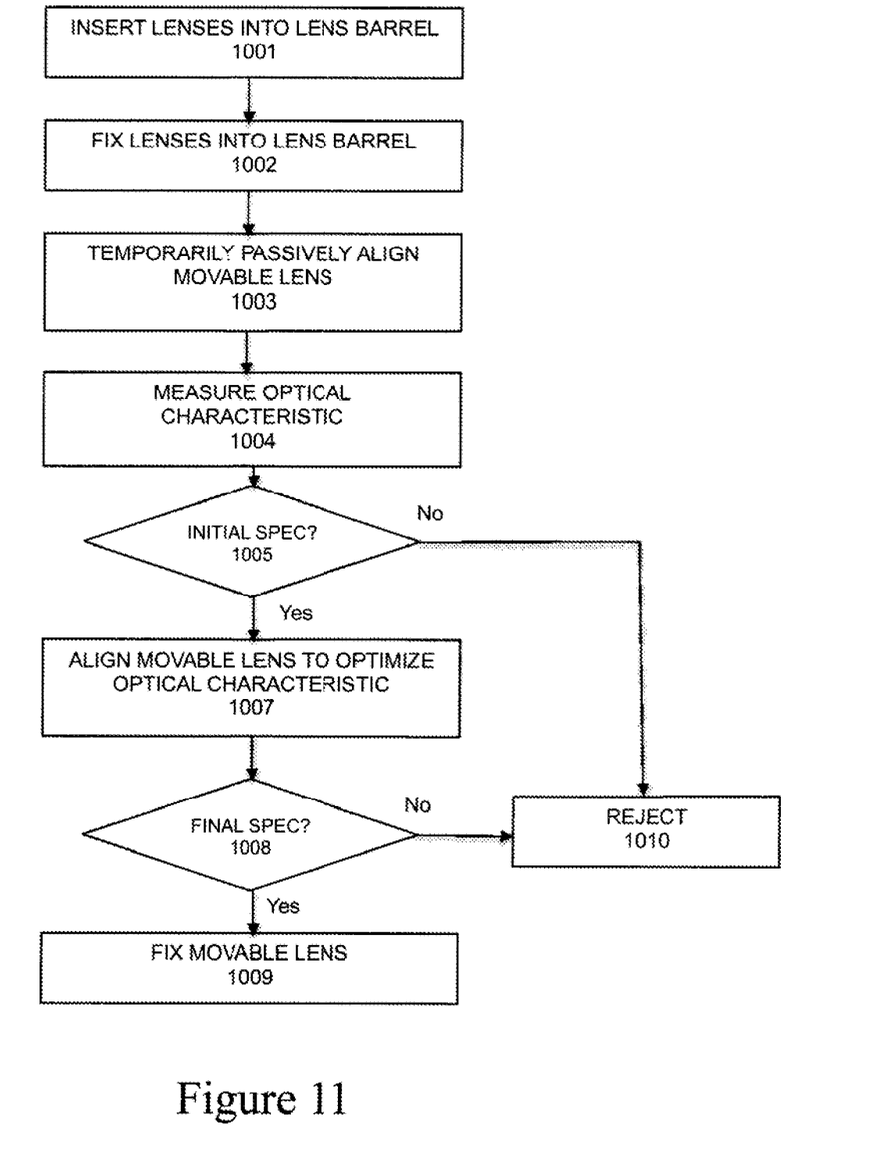
FIG. 11 is a flowchart for a method of making a lens assembly in accordance with one embodiment of the present invention.

FIG. 11 is a flowchart for a method of making a lens assembly in accordance with an embodiment of the present invention. In step 1001, a lens barrel is provided and a plurality of lenses, including at least one movable lens, and other optical elements are inserted in the lens barrel. The lenses that are not movable are aligned with each other or in a fixed position relative to the lens barrel.

In step 1002 at least one of the passively aligned lenses are fixed in position to prevent motion during latter steps. Step 1002 is optionally omitted, for example, if the passively aligned lenses are not able to move due to a tight fit with the lens barrel or are held in position by an additional component such as a retainer ring, IRCF window, lens, epoxy, or other optical or mechanical structure or the like.

In step 1003 the movable lens is passively aligned temporarily. This may be done using a passive alignment ring as previously described in reference to FIG. 4, or with a fixture that comes down on the lens assembly to align the movable lens with respect to the rest of the lens assembly. Step 1003 is optionally omitted.

In step 1004, at least one optical characteristic of the lens assembly is measured. For example, a MTF measurement may be performed by shining light through a mask that is placed at the image plane of the lens assembly and monitoring the projected image with cameras placed at various field locations, e.g., at center and the four corners at 80% field. Alternatively, a through focus MTF measurement may be performed by making multiple MTF measurements at different field positions while changing the spacing between the lens assembly and the mask. Other measurements of the imaging quality of the lens assembly may be used, including but not limited to, point spread function, line spread function, sharpness, contrast, brightness, spatial frequency response (SFR), subjective quality factor (SQF), and wave front measurement.

In step 1005, the measured optical characteristic of the lens assembly is compared with an initial specification for pass/fail decision. If the part fails, it is rejected in step 1010. If the part passes, it moves on to active alignment. This initial specification may not be as stringent as the final requirements for the lens assembly, but should determine that the optical elements in the lens assembly are of sufficient quality to warrant the effort of active alignment. For example, when using a through focus MTF measurement, different field positions may reach peak MTF at different positions of the mask with respect to the lens assembly, such as is the case of image plane tilt or field curvature. Furthermore, the tangential and sagittal MTF curves at a given field position may not be aligned, such as is the case for astigmatism.

Using programs such as Zeemax or Code V, one skilled in the art can determine the effect that movement of the movable lens within the range allowable in the lens assembly can have on the through focus MTF curves. For example, in a lens assembly where movement of the first lens in the x and y directions (orthogonal to the optical axis) significantly affects astigmatism and image plane tilt, but does not significantly affect field curvature or the peak MTF for any through focus MTF curve, the initial specification may be to have a minimum requirement for peak MTF for each curve, regardless of misalignment, since adjustments of the movable lens in active alignment will not be able to substantially increase the peak MTF for each through focus curve. The initial specification may also include a minimum requirement for field curvature, since adjustments of the movable lens in active alignment will not be able to substantially reduce field curvature.

In step 1007, the active alignment of the movable lens is performed. Preferably, the movable lens is held with, for example a first gripper, and the rest of the lens assembly is held with, for example a second gripper. The first gripper position is modified with respect to the second gripper position to adjust the position of the movable lens in the lens assembly while the imaging quality is monitored. Once a desired or optimum position for the movable lens is found, the optical characteristic of the lens assembly is compared with a final specification. If the optical characteristic does not meet the final specification, the lens assembly is rejected in step 1010. If the characteristic of the lens assembly meets the final specification, the movable lens is fixed in position in step 1009 using, for example but not limited to, an epoxy that hardens when exposed to UV light, pressure sensitive adhesive, laser welding, or localized melting.

In an alternate embodiment, the method of FIG. 11 may be simplified by eliminating steps 1002, 1003, 1004, and 1005, allowing step 1007 to proceed after step 1001. Such omissions may be acceptable in the event that, for example, the performance of the lens assembly is known to be of sufficient quality by employing other quality control processes.

Figure 12:
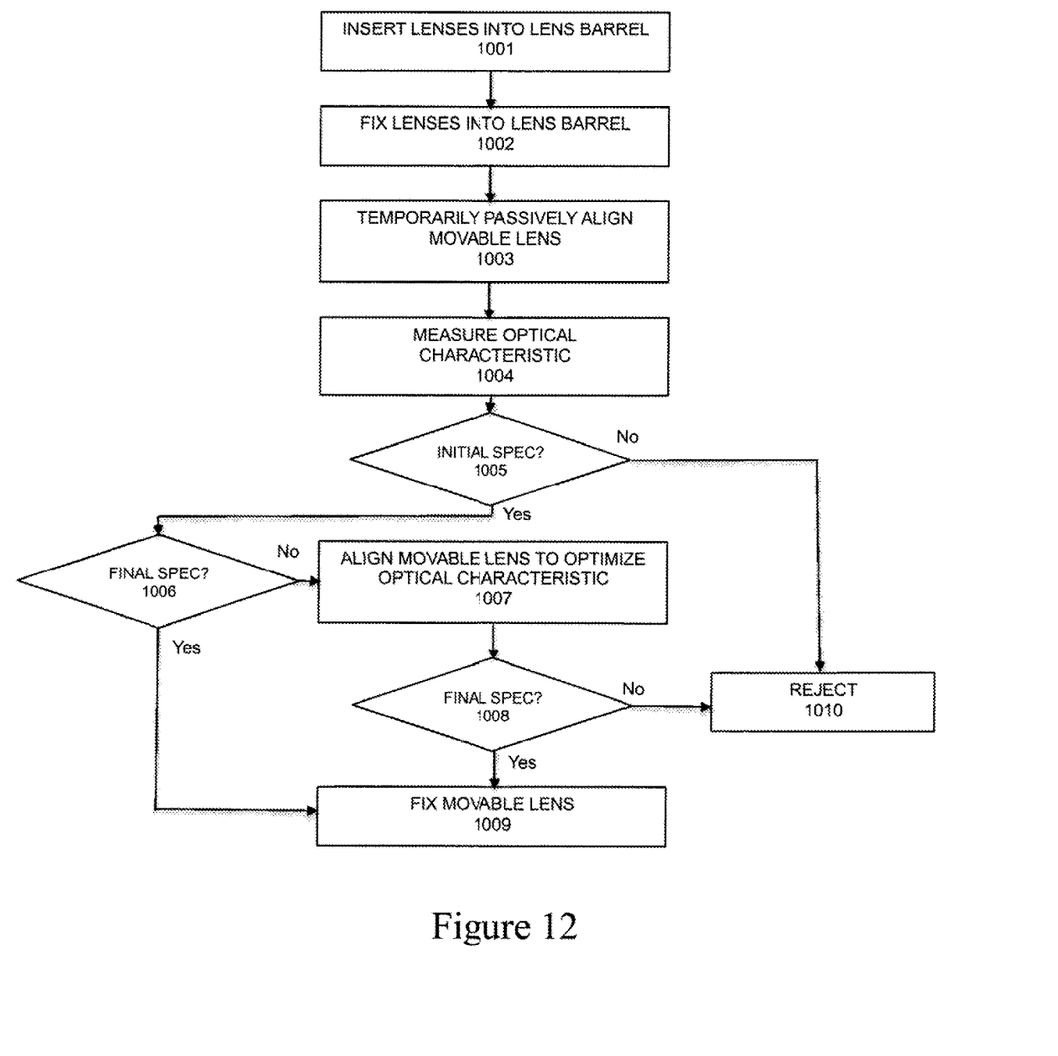
FIG. 12 is a flowchart for a method of making a lens assembly in accordance with an additional embodiment of the present invention.

FIG. 12 is a flowchart for a method of lens assembly in accordance with another embodiment of the present invention. Steps identified with the same numbers have the same function as described in connection with FIG. 11.

In step 1006, the optical characteristic of the lens assembly is compared with the final specification to determine if active alignment in step 1007 is even needed. If the optical characteristic, such as imaging quality, of the lens assembly measured in step 1004 meets the final specification in step 1006, steps 1007 and 1008 are skipped and the movable lens position is fixed in step 1009. Alternatively, if the position of the movable lens has already been temporarily fixed, for example with the passive alignment ring 321 previously described in reference to FIG. 4, the lens assembly may be secured in place using, for example but not limited to, epoxy, adhesive, laser welding, or localized melting.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described example embodiments, and it will be understood by those skilled in the art that various changes and modifications to the previous descriptions may be made within the scope of the claims.

What is claimed is:

1. A method of making a lens assembly comprising the steps of:
   providing a first plurality of lenses;
   providing a lens barrel;
   receiving the first plurality of lenses in the lens barrel;
   fixedly aligning the first plurality of lenses in the lens barrel; and
   providing at least one additional lens positioned between one of the first plurality of lenses and an aperture of the lens barrel, the at least one additional lens having at least one degree of freedom of movement with respect to the first plurality of lenses within a gap defined between the lens barrel and the at least one additional lens to accommodate movement of the at least one additional lens in the at least one degree of freedom of movement to fix the at least one additional lens in a desired alignment position with respect to the first plurality of lenses; and
   fixing the at least one additional lens in a desired alignment position with respect to the first plurality of lenses by positioning the at least one additional lens nearest the aperture.

2. The method according to claim 1, wherein the gap permits at least one degree of freedom orthogonal to an optical axis of the lens assembly.

3. The method according to claim 2, wherein the step of fixing comprises fixedly connecting the at least one additional lens to the barrel.

4. The method according to claim 2, wherein the step of fixing comprises fixedly connecting the at least one additional lens to one of the first plurality of lenses.

5. The method according to claim 2, wherein the step of fixing comprises providing at least one baffle and fixedly connecting the at least one additional lens to the baffle.

6. The method according to claim 2, wherein the at least one additional lens is movable 5 to 50 microns.

7. The method according to claim 1, wherein the at least one additional lens extends outside of one end of the lens barrel upon being fixed.

8. The method according to claim 1, wherein the step of fixing comprises fixedly connecting the at least one additional lens to one of the first plurality of lenses and to the lens barrel.

9. The method according to claim 1, wherein the at least one additional lens has a flat surface on one side facing an adjacent one of the first plurality of lenses and the adjacent one of the first plurality of lenses has a flat surface on the side facing the at least one additional lens.

10. The method according to claim 1, wherein the at least one additional lens is the lens in the lens assembly furthest away from an image plane of the lens assembly.

11. The method according to claim 1, wherein the at least one additional lens is the lens in the lens assembly closest to an image plane of the lens assembly.

12. The method according to claim 1, wherein the at least one additional lens is movable along an optical axis of the lens barrel into the desired position.

13. The method according to claim 1, wherein the at least one additional lens is movable along the optical axis up to 100 microns.

14. The method according to claim 1, wherein the step of fixing comprises using epoxy.

15. The method according to claim 1, wherein the step of fixing comprises welding.

* * * * *